United States Patent
Omura (10) Patent No.: US 7,436,649 B2
(45) Date of Patent: Oct. 14, 2008

(54) CERAMIC ELECTRONIC COMPONENT AND METHOD FOR MANUFACTURING THE SAME

(75) Inventor: Yoshihiro Omura, Shimane-ken (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 11/931,521

(22) Filed: Oct. 31, 2007

(65) Prior Publication Data

US 2008/0130199 A1 Jun. 5, 2008

Related U.S. Application Data

(63) Continuation of application No. PCT/JP2006/308400, filed on Apr. 21, 2006.

(30) Foreign Application Priority Data

May 23, 2005 (JP) ............................. 2005-148952

(51) Int. Cl.
*H01G 4/228* (2006.01)
(52) U.S. Cl. .................... 361/306.3; 29/25.42
(58) Field of Classification Search ............. 361/306.1, 361/306.3, 308.1, 308.2; 29/25.42
See application file for complete search history.

(56) References Cited

U.S. PATENT DOCUMENTS

| | | | | |
|---|---|---|---|---|
| 4,320,281 | A * | 3/1982 | Cruickshank et al. | 219/121.64 |
| 6,046,902 | A * | 4/2000 | Nakagawa et al. | 361/306.1 |
| 6,081,416 | A * | 6/2000 | Trinh et al. | 361/308.1 |
| 6,181,544 | B1 * | 1/2001 | Nakagawa et al. | 361/321.1 |
| 6,201,683 | B1 * | 3/2001 | Yamada et al. | 361/308.1 |
| 6,288,887 | B1 * | 9/2001 | Yoshida et al. | 361/306.1 |
| 6,388,864 | B1 * | 5/2002 | Nakagawa et al. | 361/309 |
| 6,433,992 | B2 * | 8/2002 | Nakagawa et al. | 361/301.4 |
| 6,515,844 | B1 * | 2/2003 | Moriwaki et al. | 361/306.1 |
| 6,574,089 | B1 * | 6/2003 | Moriwaki et al. | 361/306.3 |
| 6,704,189 | B2 * | 3/2004 | Yoshii et al. | 361/308.1 |
| 6,940,708 | B2 * | 9/2005 | Yoshii et al. | 361/303 |

FOREIGN PATENT DOCUMENTS

| | | |
|---|---|---|
| JP | 10-154633 | 6/1998 |
| JP | 2002-231564 | 8/2002 |
| JP | 2002-231565 | 8/2002 |
| JP | 2002-231569 | 8/2002 |

(Continued)

*Primary Examiner*—Eric Thomas
(74) *Attorney, Agent, or Firm*—Dickstein Shapiro LLP (57) ABSTRACT

The heat resistance of a joint between a terminal electrode and a metal terminal as well as the bonding strength of the joint are increased in a ceramic electronic component. The surface of the metal terminal in contact with a binder is formed of a coating layer which is a Ag-based metal plated film. The binder contains a metal powder composed of a Cu-based metal and having an average particle diameter of 2.0 μm or less and a glass component. The step of joining the metal terminal to a terminal electrode via the binder includes bringing the terminal electrode into intimate contact with the metal terminal via the binder and heat-treating them at a temperature in the range of 550° C. to 750° C. to form a Ag—Cu alloy layer between the metal terminal and a metal bonding layer, thus joining the terminal electrode to the metal terminal by Ag—Cu alloy bonding.

18 Claims, 6 Drawing Sheets

FOREIGN PATENT DOCUMENTS

| JP | 2002-254195 | 9/2002 |
| JP | 3376971 | 12/2002 |
| JP | 2004-47671 | 2/2004 |
| JP | 2005-125408 | 5/2005 |
| JP | 2005-167257 | 6/2005 |

* cited by examiner

NUMBER OF THERMAL SHOCK CYCLES

Fig. 13

PARTICLE SIZE OF SMALL PARTICLES/
PARTICLE SIZE OF LARGE PARTICLES

US 7,436,649 B2

CERAMIC ELECTRONIC COMPONENT AND METHOD FOR MANUFACTURING THE SAME

This is a continuation of application Ser. No. PCT/JP2006/308400, filed Apr. 21, 2006.

TECHNICAL FIELD

The present invention relates to a ceramic electronic component and a method for manufacturing the ceramic electronic component. More particularly, the present invention relates to a ceramic electronic component having a structure in which a metal terminal is attached to a terminal electrode and a method for manufacturing the ceramic electronic component.

BACKGROUND ART

Multilayer ceramic capacitors are an interesting ceramic electronic component application for the present invention. A multilayer ceramic capacitor includes a capacitor body as a ceramic electronic component body. Each end face of the capacitor body has a terminal electrode.

In a multilayer ceramic capacitor mounted on a circuit board, a stress applied to the capacitor body by the circuit board due to a thermal or mechanical factor may cause mechanical damage such as a crack to the capacitor body. Thus, to relieve such a stress and avoid mechanical damage, a multilayer ceramic capacitor having a structure in which a metal terminal is attached to a terminal electrode has been proposed.

In such a multilayer ceramic capacitor having a metal terminal, solder is generally used as a binder for joining a terminal electrode to the metal terminal, as described in Japanese Patent No. 3376971 (Patent Document 1).

However, when a multilayer ceramic capacitor is mounted on a circuit board, the capacitor body may fall off a metal terminal during a solder reflow process because solder has a relatively low melting point. Furthermore, an intermetallic compound, such as $Cu_3Sn$ or $Ag_3Sn$, may be formed by the reaction between the solder and a metal terminal. Because of the production of the intermetallic compound or difference in the coefficient of linear expansion between a metal terminal and solder, the thermal shock may cause a crack to form at the interface between the solder and the metal terminal, thus reducing the mechanical reliability.

In view of the circumstances, Japanese Unexamined Patent Application Publications Nos. 2002-231569 (Patent Document 2) and 2004-47671 (Patent Document 3) proposes that the terminal electrode and the metal terminal be joined using a Ag—Cu alloy to increase the heat resistance. Although the Ag—Cu alloy joint between the terminal electrode and the metal terminal has a high heat resistance, the bonding strength of the joint is not necessarily good.

The present inventor has investigated the cause of the low bonding strength and found that, in general, a plated layer or a paste layer is substantially lost at relatively high temperature, such as the temperature required to form the Ag—Cu alloy, that is, the eutectic temperature of the Ag—Cu alloy of 779° C., because Ag or Cu forming the plated layer or the paste layer diffuses into an adjacent layer and forms, Kirkendall voids therein. Although Patent Document 2 does not describe a specific alloying temperature, Patent Document 3 describes an alloying temperature of 800° C.

The diffusion of Ag or Cu is most likely to occur in the plated layer and is likely to occur in a bonding paste layer and a terminal electrode or a metal terminal in this order. For example, when a joint is composed of "Cu terminal electrode—Cu paste bonding layer—Ag plated layer—Cu metal terminal" in this order, the Ag plated layer first diffuses into the Cu paste bonding layer and forms Kirkendall voids therein. Thus, the Ag plated layer is lost.

In an example of Patent Document 2, a drop test is performed under a load to determine the bonding strength. According to Patent Document 2, the capacitor element does not fail under a load of 20 g. However, a load of 20 g is a very small load. The resistance to this load therefore does not necessarily mean that the bonding strength is good. The bonding strength is considered good when the bonding strength is larger than 20 g by at least one order of magnitude. The reason that the bonding strength in Patent Document 2 is not so high may be that heat treatment in alloying causes a Ag film in the metal terminal to diffuse into a Cu film in the terminal electrode, thus eliminating the Ag film.

Patent Document 1: Japanese Patent No. 3376971
Patent Document 2: Japanese Unexamined Patent Application Publication No. 2002-231569
Patent Document 3: Japanese Unexamined Patent Application Publication No. 2004-47671

DISCLOSURE OF INVENTION

Problems to be Solved by the Invention

Accordingly, the present invention provides a method for manufacturing a ceramic electronic component in which the heat resistance of a joint between a terminal electrode and a metal terminal as well as the bonding strength of the joint can be increased and also provides a ceramic electronic component manufactured by the method.

Means for Solving the Problems

In brief, the present invention is characterized in that Ag—Cu alloy bonding is used to join a terminal electrode to a metal terminal.

More particularly, the present invention is first directed to a method for manufacturing a ceramic electronic component including the steps of providing a ceramic electronic component body having terminal electrodes on both end faces, providing metal terminals to be joined to the terminal electrodes, providing a binder for joining the metal terminals to the terminal electrodes, and joining the metal terminals to the terminal electrodes via the binder. The present invention has the following features to solve the technical problems described above.

Specifically, the surface of each metal terminal in contact with the binder contains one metal selected from a Ag-based metal and a Cu-based metal. The binder contains a metal powder composed of the other metal selected from the Ag-based metal and the Cu-based metal. The metal powder has an average particle diameter of 2.0 μm or less. Furthermore, the metal terminals or the binder or both of them contain a glass component. The joining step includes bringing the terminal electrodes into intimate contact with the corresponding metal terminals via the binder and heat-treating them at a temperature in the range of 550° C. to 750° C. to join the terminal electrodes to the corresponding metal terminals by Ag—Cu alloy bonding.

In a method for manufacturing a ceramic electronic component according to the present invention, preferably, the metal powder contained in the binder is composed of large particles having relatively large diameters and small particles having relatively small diameters. In other words, preferably, the metal powder has a particle size distribution having at least two peaks. The ratio of the average particle diameter of the small particles to the average particle diameter of the large particles is preferably in the range of 0.3 to 0.6. More preferably, the average particle diameter of the small particles is 1 µm or less.

Furthermore, in a method for manufacturing a ceramic electronic component according to the present invention, preferably, the metal terminals include a base material composed of a Cu-based metal and a coating layer formed of a Ag-based metal plated film, and the binder contains a Cu-based metal powder and a glass component.

Furthermore, in a method for manufacturing a ceramic electronic component according to the present invention, preferably, the metal terminals include a base material composed of a Cu-based metal and a coating layer formed of a Ag-based metal plated film, and the binder contains a Cu-based metal powder and a glass component.

A ceramic electronic component according to the present invention is characterized in that the surface of each metal terminal in contact with the corresponding metal bonding layer contains a Ag-based metal or a Cu-based metal, the metal bonding layers contain a glass component and have a percentage of compact area of at least 40%, and the metal terminals are joined to the corresponding metal bonding layers via a Ag—Cu alloy.

In a ceramic electronic component according to the present invention, preferably, the metal terminals include a base material composed of a Cu-based metal and a coating layer formed of a Ag-based metal plated film, and the metal bonding layers are composed of a Cu-based metal.

In the present invention, preferably, the glass component is mainly composed of at least two oxides selected from the group consisting of Bi, Si, B, Pb and Zn.

ADVANTAGES OF THE INVENTION

According to a method for manufacturing a ceramic electronic component of the present invention, the terminal electrodes are joined to the corresponding metal terminals by Ag—Cu alloy bonding. The Ag—Cu alloy bonding can increase the heat resistance of the joints.

Furthermore, according to a method for manufacturing a ceramic electronic component of the present invention, the average particle diameter of a metal powder contained in the binder is 2.0 µm or less, and the metal terminals or the binder or both of them contain a glass component. This can increase the reactivity between Ag and Cu and decrease the alloying temperature of Ag and Cu. Consequently, a Ag—Cu alloy can be formed at a relatively low temperature in the range of 550° C. to 750° C. Thus, for example, even the most diffusive plated layer can certainly be retained. The joints between the terminal electrodes and the metal terminals have high bonding strength and exhibit highly reliable bonding.

In a method for manufacturing a ceramic electronic component according to the present invention, as described above, when the metal powder contained in the binder is composed of large particles and small particles, and when the ratio of the average particle diameter of the small particles to the average particle diameter of the large particles is in the range of 0.3 to 0.6, the close packing of the particles constituting the metal powder becomes easier, and voids among the particles can be reduced. This can increase the reactivity of the particles constituting the metal powder, increase the percentage of compact area in the joints after heat treatment, and thereby ensure high bonding strength. In particular, when the average particle diameter of the small particles is 1 µm or less, these effects become more remarkable. To further ensure these effects, the metal powder preferably contains 5 to 50 parts by weight of the small particles per 100 parts by weight of the large particles.

According to a ceramic electronic component according to the present invention, the percentage of compact area in each metal bonding layer joining the terminal electrodes to the metal terminals is at least 40% (the percentage of pores is less than 60%). This ensures high electrical conductivity and high mechanical strength of the joints.

In the present invention, when the metal terminals include a base material composed of a Cu-based metal and a coating layer formed of a Ag-based metal plated film, and when the binder contains the Cu-based metal powder and a glass component, the terminal electrodes, the metal bonding layers, and the metal terminals in the ceramic electronic component thus manufactured can entirely be formed of the Cu-based metal.

The terminal electrodes, the metal bonding layers, and the metal terminals can therefore have substantially the same coefficient of linear expansion. Thus, thermal stress is hardly generated at the joints. Consequently, cracks are hardly caused at the joints by thermal shock. Hence, the ceramic electronic component can have higher mechanical reliability.

Cu-based metals have electric conductivity and thermal conductivity higher than those of Fe—Ni-based metals, for example. Higher electric conductivity and higher thermal conductivity can prevent heat generation caused by the electrical resistance of the joints and enhance heat transfer from the ceramic electronic component body to a circuit board. Thus, the preferred embodiments can advantageously be applied to smoothing capacitors used at large currents.

BRIEF DESCRIPTION OF THE DRAWINGS

FIG. 1a illustrates the state before the heat treatment for joining a metal terminal 2 to a terminal electrode 8 and FIG. 1b illustrates the state after the heat treatment.

REFERENCE NUMERALS 1, 21a to 21g ceramic electronic components
2, 25a to 25g metal terminals
3 ceramic layer
4, 5 internal electrodes
6, 23 ceramic electronic component bodies
7 end face
8, 24 terminal electrodes
10 binder
10a, 26 metal bonding layers
11 base material
12, 13 coating layers
14 Ag—Cu alloy layer

BEST MODE FOR CARRYING OUT THE INVENTION

Figure 1A:
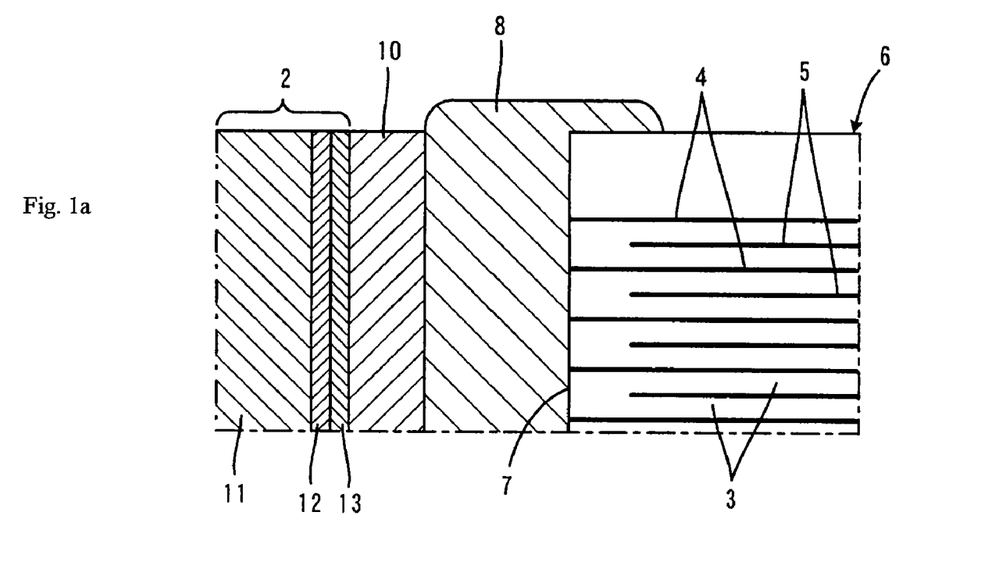
FIGS. 1a and 1b are fragmentary enlarged cross-sectional views of a ceramic electronic component 1 according to an embodiment of the present invention.
Figure 1B:
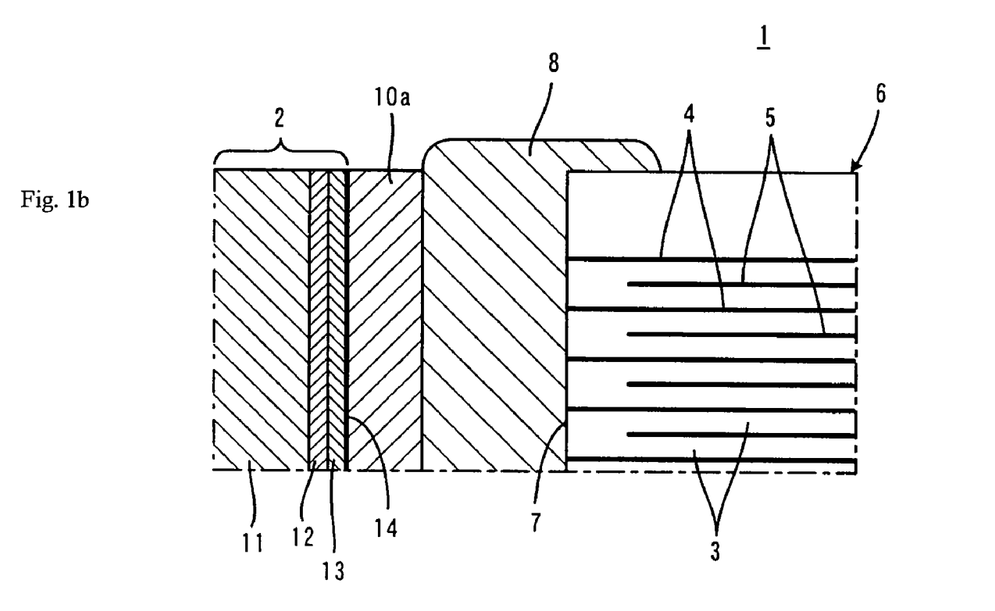

FIGS. 1a and 1b are fragmentary enlarged views of a ceramic electronic component 1 according to an embodiment of the present invention. In FIG. 1a illustrates the state before the heat treatment for joining of a metal terminal 2 and 1b illustrates the state after the heat treatment.

The ceramic electronic component 1, which constitutes a multilayer ceramic capacitor, includes a ceramic electronic component body 6 having a layered structure in which a plurality of laminated ceramic layers 3 and internal electrodes 4 and 5 are alternately stacked. Of the internal electrodes 4 and 5, internal electrodes 4 are led to one end face 7 of the ceramic electronic component body 6, and the internal electrodes 5 are led to the other end face of the ceramic electronic component body 6 (not shown). The internal electrodes 4 and the internal electrodes 5 are alternately placed in the laminated direction.

FIGS. 1a and 1b illustrate a structure on the side of one end face 7 of the ceramic electronic component body 6. The structure on the side of one end face 7 is substantially the same as the structure on the side of the other end face (not shown). Hence, the structure on the side of the illustrated end face 7 is described below. The structure on the side of the other end face is not described.

A terminal electrode 8, which is electrically connected to the internal electrodes 4, is formed on the end face 7 of the ceramic electronic component body 6. The terminal electrode 8 is formed, for example, by baking a conductive paste containing a Cu-based metal powder.

To manufacture the ceramic electronic component 1, the ceramic electronic component body 6 including the terminal electrode 8 as described above is provided. Furthermore, a metal terminal 2 to be joined to the terminal electrode 8 and a binder 10 for joining the metal terminal 2 to the terminal electrode 8 are provided.

As illustrated in FIG. 1a, the metal terminal 2 includes a base material 11 and coating layers 12 and 13. Preferably, the base material 11 is composed of a Cu-based metal, for example, a heat-resistant copper alloy, such as beryllium copper, a Corson alloy, or phosphor bronze. The underlying coating layer 12 formed on the base material 11 is formed of a Ni-based metal plated film. The coating layer 13 formed on the coating layer 12 is formed of a Ag-based metal plated film. Thus, the outermost layer surface of the metal terminal 2 is formed of the Ag-based metal.

The binder 10 contains a metal powder composed of a Cu-based metal and having an average particle diameter of 2.0 μm or less and a glass component. Preferably, the Cu-based metal powder is a spherical Cu powder having a sphericity in the range of 1.2 to 2.4. When the surface of the outermost layer of the metal terminal 2 is formed of a Cu-based metal rather than the Ag-based metal, the metal powder contained in the binder 10 is composed of a Ag-based metal.

The Ag-based metal and the Cu-based metal used as described above may be not only pure Ag and pure Cu, but also be those including another metal, for example, to increase the hardness or to adjust the melting point, provided that the characteristics of the Ag-based metal and the Cu-based metal are not substantially impaired. More specifically, Sn, Zn, and/or Cd may be added to the main component Ag in the Ag-based metal. For the Cu-based metal, Sn, Zn, Ni, and/or P may be added to the main component Cu.

The metal powder contained in the binder 10, which has an average particle diameter of 2.0 μm or less, as described above, preferably contains both large particles having relatively large diameters and small particles having relatively small diameters. In this case, the ratio of the average particle diameter of the small particles to the average particle diameter of the large particles is in the range of 0.3 to 0.6. More preferably, the average particle diameter of the small particles is 1 μm or less.

When the metal powder contained in the binder 10 contains both the large particles and the small particles, the close packing of the particles becomes easier. Even when the large particles and the small particles are mixed, the sphericity of each particle is preferably in the range of 1.2 to 2.4, as described above. Preferably, the metal powder contains 5 to 50 parts by weight of the small particles per 100 parts by weight of the large particles.

Preferably, the glass component contained in the binder 10 is mainly composed of at least two oxides selected from the group consisting of Bi, Si, B, Pb, and Zn, for example, a $Bi_2O_3$—$B_2O_3$—$SiO_2$ glass or a PbO—ZnO—$SiO_2$ glass. The glass component may be contained in the metal terminal 2 in place of or in addition to the binder 10.

Then, a joining step of joining the metal terminal 2 to the terminal electrode 8 via the binder 10 is performed. As illustrated in FIG. 1a, the joining step includes bringing the terminal electrode 8 into intimate contact with the metal terminal 2 via the binder 10 and heat-treating them at a temperature in the range of 550° C. to 750° C. Consequently, as illustrated in FIG. 1b, the binder 10 sinters to form a metal bonding layer 10a. The metal terminal 2 is joined to the terminal electrode 8 via the metal bonding layer 10a. A Ag—Cu alloy layer 14 is formed between the metal terminal 2, more specifically, the coating layer 13 formed of a Ag-based metal and the metal bonding layer 10a formed of a Cu-based metal. Thus, the terminal electrode 8 is joined to the metal terminal 2 by Ag—Cu alloy bonding.

The Ag—Cu alloy layer 14 has a heat resistance higher than that of solder. Furthermore, the average particle diameter of a Cu-based metal powder contained in the binder 10 is 2.0 μm or less, and the binder 10 contains a glass component. This can increase the reactivity between Ag and Cu and decrease the alloying temperature of Ag and Cu. Consequently, as described above, Ag and Cu can form an alloy by heat treatment at a temperature in the range of 550° C. to 750° C. without the diffusion of Ag or Cu.

Figure 2:
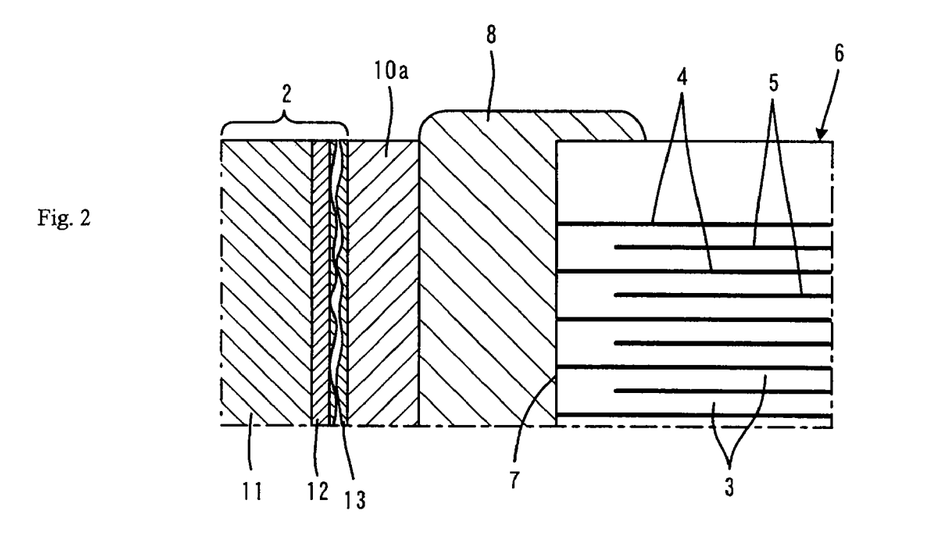
FIG. 2 is a fragmentary cross-sectional view corresponding to FIG. 1b and illustrates the state after the heat treatment at a temperature over 750° C.

When the heat treatment temperature is less than 550° C., Ag and Cu cannot form a good alloy and therefore the bonding strength is low. When the heat treatment temperature is more than 750° C., as illustrated in FIG. 2, Ag contained in the coating layer 13 diffuses into the binder 10 or the metal bonding layer 10a containing Cu and forms Kirkendall voids. The bonding strength is therefore low. In FIG. 2, most of the coating layer 13 formed of a Ag-based metal is lost and is changed to voids.

As described above, when the metal powder contained in the binder 10 is composed of large particles and small particles, and when the ratio of the average particle diameter is in the range of 0.3 to 0.6, voids among the particles can be reduced. This can increase the reactivity of the metal powder in the heat treatment step described above, increase the percentage of compact area in the metal bonding layer 10a, and achieve higher bonding strength between the terminal electrode 8 and the metal terminal 2.

While the present invention is applied to a multilayer capacitor in the above-mentioned embodiment, the present invention may be applied to not only multilayer ceramic capacitors, but also other ceramic electronic components such as resistors and inductors.

Figure 5:
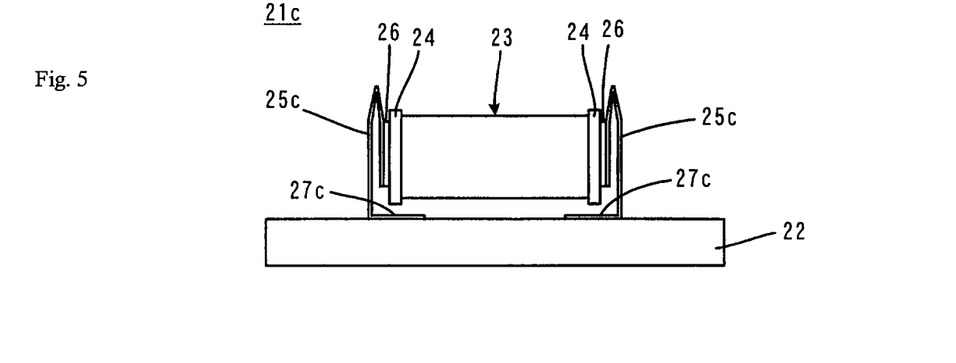
FIG. 5 is a front view illustrating a third example of the shape of metal terminals provided in a ceramic electronic component according to the present invention.
Figure 6:
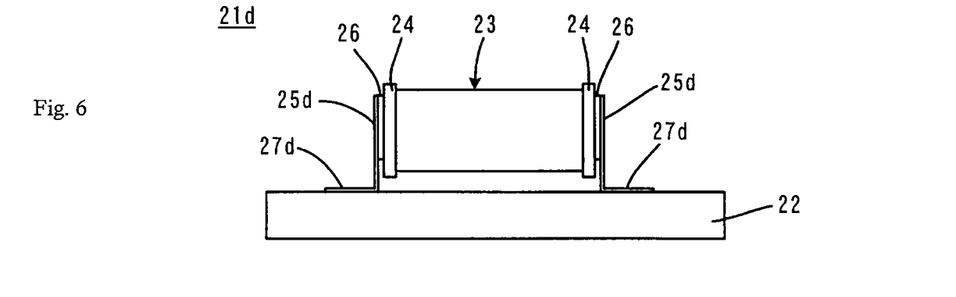
FIG. 6 is a front view illustrating a fourth example of the shape of metal terminals provided in a ceramic electronic component according to the present invention.
Figure 7:
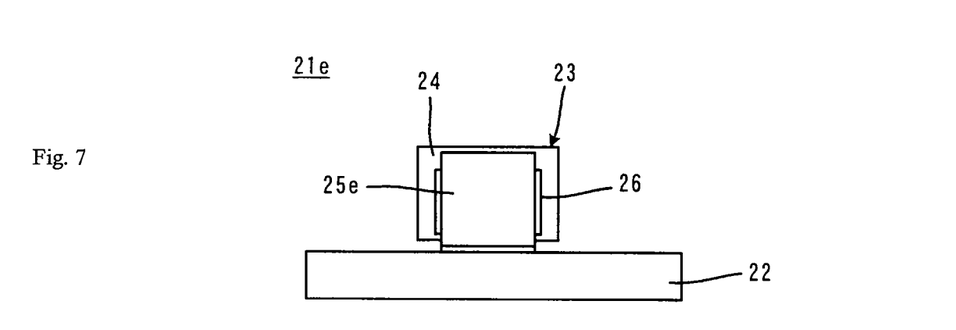
FIG. 7 is a side view illustrating a fifth example of the shape of metal terminals provided in a ceramic electronic component according to the present invention.
Figure 8:
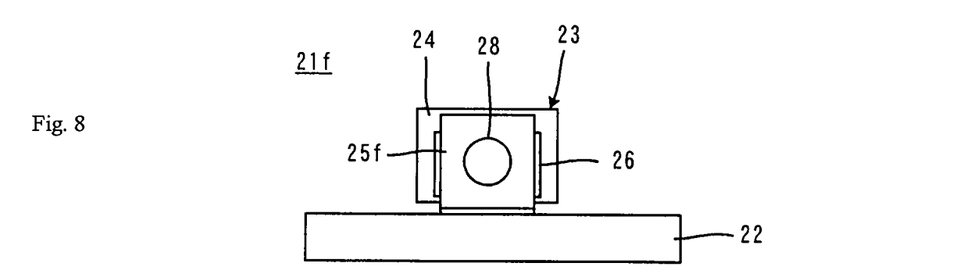
FIG. 8 is a side view illustrating a sixth example of the shape of metal terminals provided in a ceramic electronic component according to the present invention.
Figure 9:
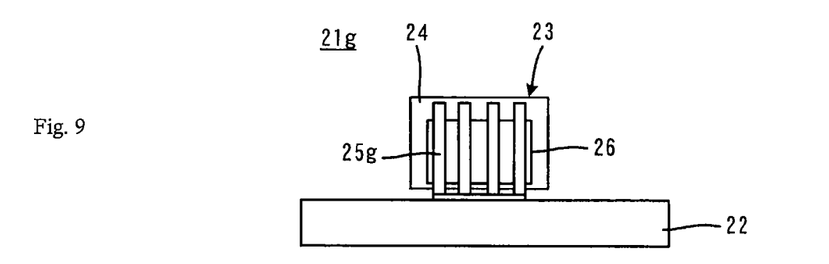
FIG. 9 is a side view illustrating a seventh example of the shape of metal terminals provided in a ceramic electronic component according to the present invention.

FIGS. 3 to 9 illustrate various examples of the shape of a metal terminal provided in a ceramic electronic component according to the present invention. FIGS. 3 to 6 are front views of ceramic electronic components 21a, 21b, 21c, and 21d, respectively. FIGS. 7 to 9 are side views of ceramic electronic components 21e, 21f, and 21g, respectively.

FIGS. 3 to 9 illustrate the ceramic electronic components 21a to 21g mounted on a circuit board 22. Each of the ceramic electronic component 21a to 21g includes a ceramic electronic component body 23, terminal electrodes 24 formed on both end faces of the ceramic electronic component body 23, and metal bonding layers 26 joining metal terminals 25a to 25g to the terminal electrodes 24.

Figure 3:
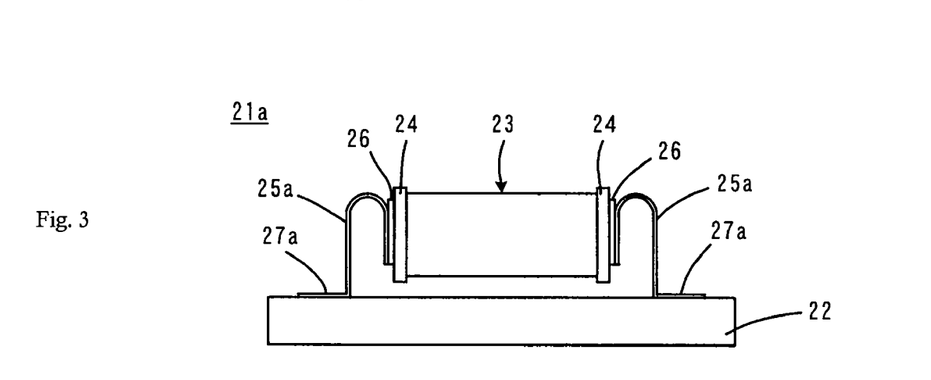
FIG. 3 is a front view illustrating a first example of the shape of metal terminals provided in a ceramic electronic component according to the present invention.

In the ceramic electronic component 21a illustrated in FIG. 3, the metal terminals 25a have an inverted U-shape. Connecting ends 27a, which serve as joints to the circuit board 22, are bent outward relative to the ceramic electronic component body 23.

Figure 4:
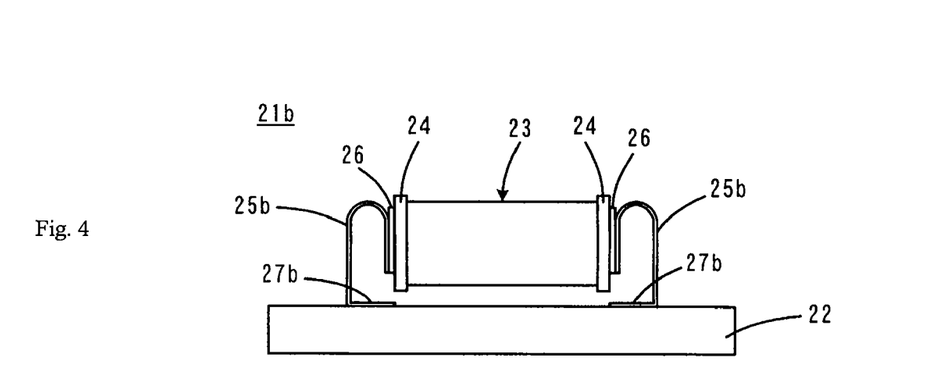
FIG. 4 is a front view illustrating a second example of the shape of metal terminals provided in a ceramic electronic component according to the present invention.

In the ceramic electronic component 21b illustrated in FIG. 4, the metal terminals 25b have an inverted U-shape as in the metal terminals 25a. However, connecting ends 27b, which serve as joints to the circuit board 22, are bent inward relative to the ceramic electronic component body 23.

In the ceramic electronic component 21c illustrated in FIG. 5, the metal terminals 25c have an inverted V-shape having a relatively acute angle. Connecting ends 27c, which serve as joints to the circuit board 22, are bent inward relative to the ceramic electronic component body 23.

In the ceramic electronic component 21d illustrated in FIG. 6, the metal terminals 25d including connecting ends 27d have an L-shape. The connecting ends 27d are bent outward relative to the ceramic electronic component body 23.

The ceramic electronic component 21e illustrated in FIG. 7 has general tabular metal terminals 25e.

The ceramic electronic component 21f illustrated in FIG. 8 has metal terminals 25f having a double structure as illustrated in FIGS. 3 to 5. The metal terminals 25f have an opening 28 on the outside thereof.

The ceramic electronic component 21g illustrated in FIG. 9 has comblike metal terminals 25g.

Experimental examples performed to demonstrate the effects of the present invention are described below.

EXPERIMENTAL EXAMPLE 1

A ceramic electronic component body including internal electrodes formed of a Ni-based metal and terminal electrodes formed of a Cu-based metal was provided for use in a multilayer ceramic capacitor. Furthermore, a conductive paste containing a Cu-based metal powder having an average particle diameter of 1.3 μm, a $Bi_2O_3$—$B_2O_3$—$SiO_2$ glass component, and an organic vehicle was provided as a binder. Furthermore, metal terminals that included a beryllium copper base material, an undercoating layer formed of a Ni plated film, and a coating layer formed of a Ag plated film disposed on the undercoating layer and that had a shape as illustrated in FIG. 3 were provided.

Then, the terminal electrodes and the metal terminals were brought into intimate contact with each other via the binder, were fixed, and were directly heated in a thermostat at a temperature of 150° C. for 20 minutes to dry the organic vehicle component contained in the conductive paste binder. Then, the product was directly heat-treated in a neutral atmosphere in a oven at a temperature of 500° C., 550° C., 600° C., 650° C., 700° C., 750° C., or 800° C. Thus, as samples, ceramic electronic components having the metal terminals were prepared.

Figure 10:
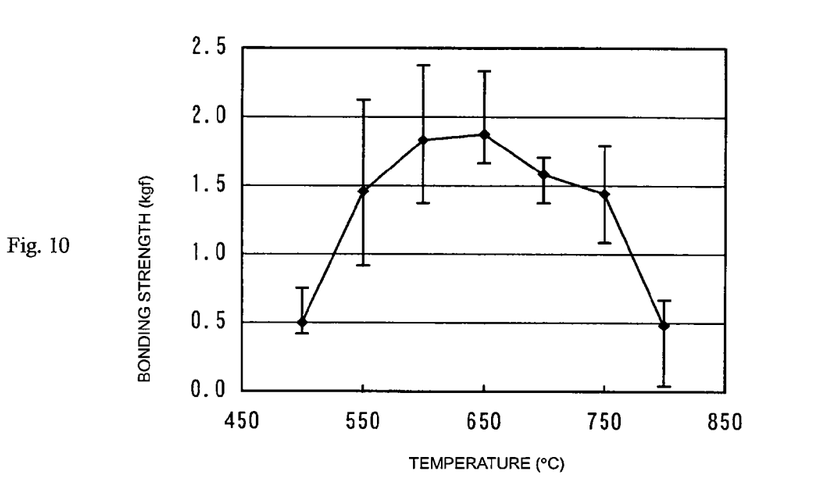
FIG. 10 is a graph illustrating the relationship between the heat treatment temperature and the bonding strength of a metal terminal in samples prepared in Experimental Example 1.

FIG. 10 shows the measurements of the bonding strength between the metal terminals and the terminal electrodes of the ceramic electronic components thus prepared.

As shown in FIG. 10, relatively high bonding strengths were achieved at a heat treatment temperature in the range of 550° C. to 750° C. In contrast, when the heat treatment temperature is less than 550° C., that is, 500° C., the bonding strength is low because Ag contained in the metal terminals and Cu contained in the binder were not satisfactorily alloyed. When the heat treatment temperature is more than 750° C., that is, 800° C., the bonding strength is low because Ag contained in the metal terminals diffused into the binder and formed Kirkendall voids therein.

Figure 11:
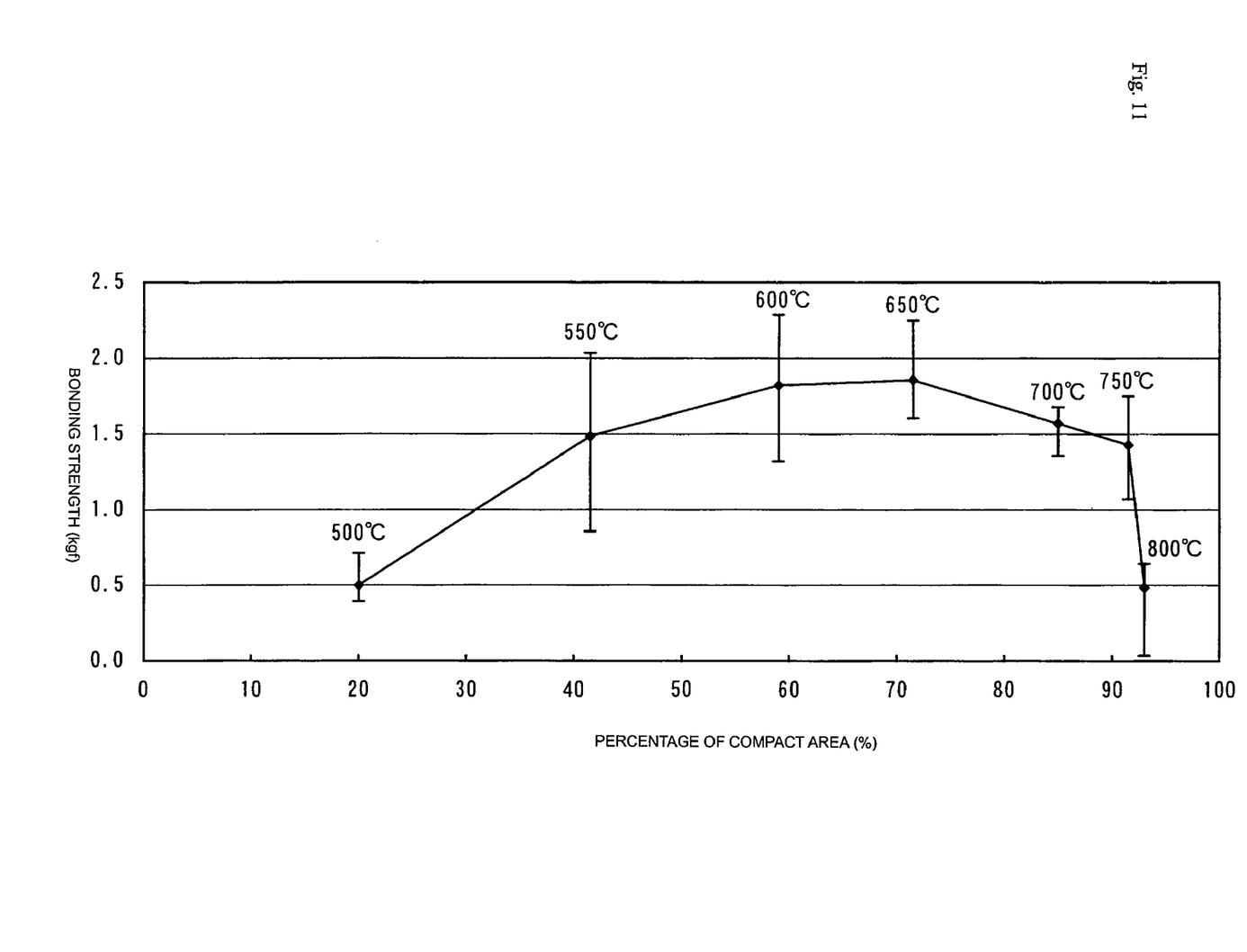
FIG. 11 is a graph illustrating the relationship between the percentage of compact area in a metal bonding layer and the bonding strength of a metal terminal in the samples shown in FIG. 10.

FIG. 11 shows the percentage of compact area in each sample shown in FIG. 10. The percentage of compact area was determined at any point in a metal bonding layer after heat treatment on the basis of the area ratio in a cross-sectional photomicrograph.

As shown in FIG. 11, the bonding strength is low at a percentage of compact area below 40% (a state where the alloying proceeds only a little). The bonding strength decreases rapidly at a percentage of compact area over 91% (at a heat treatment temperature over 750° C.). This is probably because Ag contained in the metal terminals diffuses at a heat treatment temperature over 750° C. The reason for a gradual decrease in the bonding strength at a percentage of compact area over 70% (at a heat treatment temperature over 650° C.) may be that the glass component in the metal bonding layer diffuses gradually.

In Experimental Example 1, while the glass component contained in the binder was a $Bi_2O_3$—$B_2O_3$—$SiO_2$ glass, use of a $Bi_2O_3$—$B_2O_3$—$SiO_2$ glass also gave substantially the same results.

EXPERIMENTAL EXAMPLE 2

Figure 12:
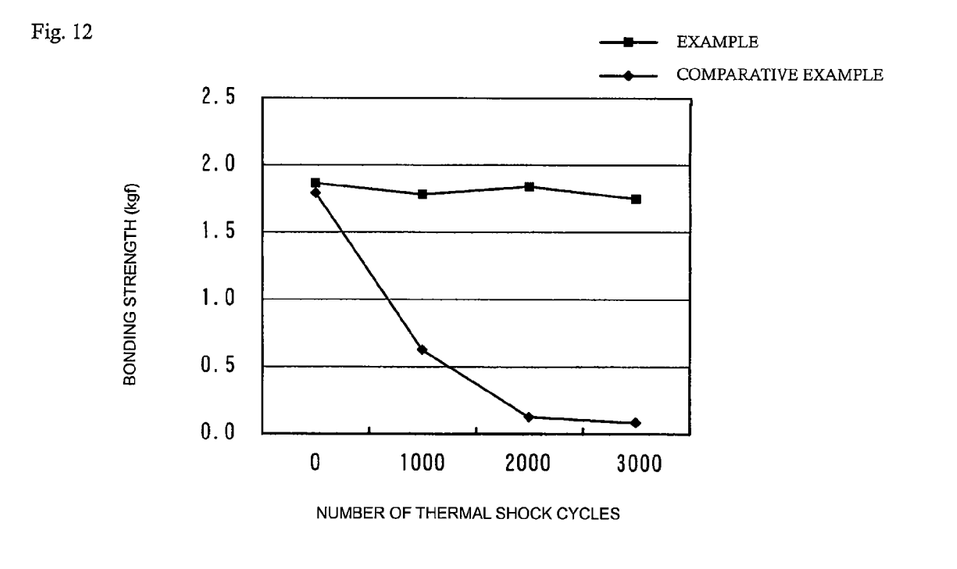
FIG. 12 is a graph illustrating the effect of thermal shock on the bonding strength of a metal terminal in an example and a comparative example evaluated in Experimental Example 2.

Among the samples prepared in Experimental Example 1, a sample prepared at a heat treatment temperature of 650° C. was used as Example. A sample in which solder was used as the binder was used as Comparative Example. The effects of thermal shock on the bonding strength of a metal terminal were examined in Example and Comparative Example. FIG. 12 shows the results.

As shown in FIG. 12, the bonding strength of Comparative Example decreased considerably owing to the thermal shock. However, the bonding strength of Example decreased only very little.

EXPERIMENTAL EXAMPLE 3

In Experimental Example 1, a conductive paste containing a Cu-based metal powder having an average particle diameter of 1.3 μm was used as the binder. In Experimental Example 3, a Cu-based metal powder contained in a conductive paste binder was composed of large particles having relatively large diameters and small particles having relatively small diameters.

Figure 13:
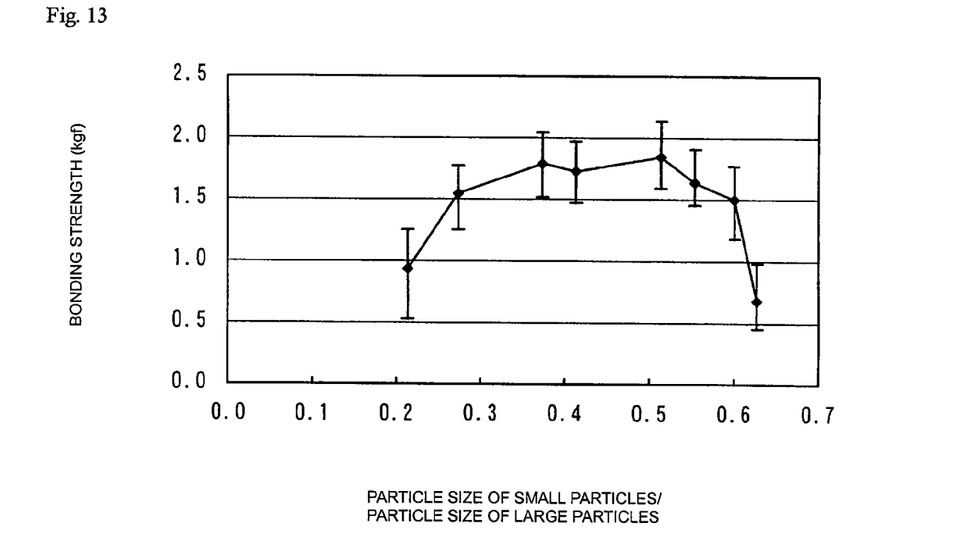
FIG. 13 is a graph illustrating the relationship between the ratio of the average particle diameter of small particles to the average particle diameter of large particles and the bonding strength of a metal terminal, evaluated in Experimental Example 3.

More specifically, the average particle diameter of the large particles was set at 1.25 μm, and the average particle diameter of the small particles was changed. The Cu-based metal powder contained 25 parts by weight of the small particles per 100 parts by weight of the large particles. The heat treatment temperature was set at 650° C. The other conditions were the same as those in Experimental Example 1. Ceramic electronic component samples were thus prepared. The bonding strength between a metal terminal and a terminal electrode of the ceramic electronic component was evaluated. FIG. 13 shows the results.

As shown in FIG. 13, the bonding strength varied with the "particle size of small particles/particle size of large particles" ratio. Relatively high bonding strengths were achieved at a "particle size of small particles/particle size of large particles" ratio in the range of 0.3 to 0.6.

On the other hand, the "particle size of small particles/particle size of large particles" ratio over 0.6 resulted in lower reactivity of the Cu-based metal powder and therefore lower bonding strength. At a "particle size of small particles/particle size of large particles" ratio below 0.3, the small particles agglomerate together. Thus, the dispersibility of the metal powder decreases and the denseness of the joint is impaired. Consequently, the bonding strength decreases.

The invention claimed is:

1. A method for manufacturing a ceramic electronic component, comprising the steps of:
   providing a ceramic electronic component body having a terminal electrode on an end face;
   providing a metal terminal to be joined to the terminal electrode;
   providing a binder for joining the metal terminal to the terminal electrode; and
   joining the metal terminal to the terminal electrode via the binder,
   wherein the surface of the metal terminal in contact with the binder contains one of a Ag-based metal and a Cu-based metal,
   the binder contains a metal powder comprising the other of the Ag-based metal and the Cu-based metal and which has an average particle diameter of 2.0 μm or less,
   the metal terminal or the binder or both of them contain a glass, and
   the joining step comprises bringing the terminal electrode into contact with the corresponding metal terminal via the binder and heat-treating the resulting structure at a temperature in the range of 550° C. to 750° C. to join the terminal electrode to the corresponding metal terminal by Ag—Cu alloy bonding.

2. The method for manufacturing a ceramic electronic component according to claim 1, wherein the metal powder contained in the binder comprises particles having relatively large diameters and particles having relatively small diameters such that the ratio of the average particle diameter of the small particles to the average particle diameter of the large particles is in the range of 0.3 to 0.6.

3. The method for manufacturing a ceramic electronic component according to claim 2, wherein the average particle diameter of the small particles is 1 μm or less.

4. The method for manufacturing a ceramic electronic component according to claim 3, wherein the metal terminal comprises a Cu-based metal and a coating layer formed of a Ag-based metal plated film, and the binder comprises a Cu-based metal and the glass component.

5. The method for manufacturing a ceramic electronic component according to claim 4, wherein the glass mainly comprises at least two oxides selected from the group consisting of the oxides of Bi, Si, B, Pb and Zn.

6. The method for manufacturing a ceramic electronic component according to claim 5, wherein the Cu-based metal has a sphericity of 1.2 to 2.4.

7. The method for manufacturing a ceramic electronic component according to claim 6, wherein the contact areas of the terminal electrode and metal terminal contain less than 60% pores.

8. The method for manufacturing a ceramic electronic component according to claim 7, wherein the metal powder contains 5 to 50 parts by weight of small particles per 100 parts by weight of large particles.

9. The method for manufacturing a ceramic electronic component according to claim 2, wherein the metal terminal comprises a Cu-based metal and a coating layer formed of a Ag-based metal plated film, and the binder comprises a Cu-based metal and the glass component.

10. The method for manufacturing a ceramic electronic component according to claim 9, wherein the metal powder contains 5 to 50 parts by weight of small particles per 100 parts by weight of large particles.

11. The method for manufacturing a ceramic electronic component according to claim 1, wherein the metal terminal comprises a Cu-based metal and a coating layer formed of a Ag-based metal plated film, and the binder comprises a Cu-based metal and the glass component.

12. The method for manufacturing a ceramic electronic component according to claim 1, wherein the glass mainly comprises at least two oxides selected from the group consisting of the oxides of Bi, Si, B, Pb and Zn.

13. A ceramic electronic component, comprising:
   a ceramic electronic component body;
   a terminal electrode on an end face of the ceramic electronic component body; and
   a metal terminal joined to the terminal electrode via a metal bonding layer,
   wherein the surface of the metal terminal in contact with the metal bonding layer contains one of a Ag-based metal and a Cu-based metal, and
   the metal bonding layer contains a glass component and has a percentage of pores of less than 60%, and
   the interface of the metal terminal and the metal bonding layer comprises a Ag—Cu alloy.

14. The ceramic electronic component according to claim 13, wherein the metal terminal comprises a Cu-based metal and a coating layer of a Ag-based metal plated film, and the metal bonding layer comprises a Cu-based metal.

15. The ceramic electronic component according to claim 14, wherein the glass component is mainly composed of at least two oxides selected from the group consisting of the oxides of Bi, Si, B, Pb and Zn.

16. The ceramic electronic component according to claim 13, having a second terminal electrode disposed spaced from the other terminal electrode, a second metal terminal joined to the second terminal electrode via a second metal bonding layer, wherein the surface of the second metal terminal in contact with the second metal bonding layer contains one of a Ag-based metal and a Cu-based metal, and the second metal bonding layer contains a second glass component and has a percentage of pores of less than 60%, and the interface of the second metal terminal and the second metal bonding layer comprises a Ag—Cu alloy.

17. The ceramic electronic component according to claim 16, wherein the second metal terminal comprises a Cu-based metal and a coating layer of a Ag-based metal plated film, and the second metal bonding layer comprises a Cu-based metal.

18. The ceramic electronic component according to claim 17, wherein the second glass component is mainly composed of at least two oxides selected from the group consisting of the oxides of Bi, Si, B, Pb and Zn.

* * * * *